(12) United States Patent
Tanaka

(10) Patent No.: US 10,737,728 B2
(45) Date of Patent: Aug. 11, 2020

(54) VEHICLE BODY LOWER STRUCTURE

(71) Applicant: TOYOTA JIDOSHA KABUSHIKI KAISHA, Toyota-shi (JP)

(72) Inventor: Motoyuki Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 43 days.

(21) Appl. No.: 16/253,509

(22) Filed: Jan. 22, 2019

(65) Prior Publication Data

US 2019/0225273 A1    Jul. 25, 2019

(30) Foreign Application Priority Data

Jan. 22, 2018   (JP) .................. 2018-008049

(51) Int. Cl.
*B62D 21/15* (2006.01)
*B62D 21/03* (2006.01)
*B62D 25/20* (2006.01)
*B62D 21/11* (2006.01)

(52) U.S. Cl.
CPC .......... *B62D 21/155* (2013.01); *B62D 21/03* (2013.01); *B62D 25/2018* (2013.01); *B62D 21/11* (2013.01)

(58) Field of Classification Search
CPC .. B62D 21/155; B62D 21/03; B62D 25/2018; B62D 21/11; B62D 21/00; B62D 21/15
USPC .................................................... 296/187.09
See application file for complete search history.

(56) References Cited

U.S. PATENT DOCUMENTS

| 8,480,102 | B2* | 7/2013 | Yamada | B62D 21/155 180/311 |
| 8,672,393 | B2* | 3/2014 | Tomozawa | B62D 25/082 296/187.09 |
| 9,216,767 | B2* | 12/2015 | Garnweidner | B62D 21/155 |
| 9,422,004 | B2* | 8/2016 | Fujihara | B62D 21/152 |
| 2019/0118863 | A1* | 4/2019 | Hara | B62D 21/09 |

FOREIGN PATENT DOCUMENTS

JP    2003-252250    9/2003

* cited by examiner

*Primary Examiner* — Pinel E Romain
(74) *Attorney, Agent, or Firm* — Oblon, McClelland, Maier & Neustadt, L.L.P.

(57) ABSTRACT

A catcher bracket is provided to protrude from a bottom wall of an inner torque box in a downward direction. Collapse beads which become starting points of collapse deformation in an up-and-down direction are formed on bent portions which correspond to boundaries between an inner wall and a rear wall and between an outer wall and the rear wall of the catcher bracket.

2 Claims, 9 Drawing Sheets

VEHICLE BODY LOWER STRUCTURE

CROSS REFERENCE TO RELATED APPLICATION

This application claims priority to Japanese Patent Application No. 2018-008049 filed on Jan. 22, 2018, which is incorporated herein by reference in its entirety including the specification, claims, drawings, and abstract.

TECHNICAL FIELD

The present disclosure relates to a lower structure of a vehicle body, and in particular to a vehicle body lower structure at a front side of a vehicle.

BACKGROUND

A front suspension member (hereinafter also referred to as "FR suspension member") which supports suspension of front wheels of a vehicle is supported by a front side member (hereinafter also referred to as "FR side member") which is a skeleton member at a front side of the vehicle.

Specifically, as shown in FIG. 7, a FR side member 104 extends from an engine room (not shown) to a region below a vehicle cabin. A kick portion 104A which is a portion, of the FR side member 104, below the vehicle cabin; that is, a portion below a floor panel 108, and a rear end of the FR suspension member 100 are combined via a suspension member brace 102 (hereinafter also referred to as "SM brace").

In addition, between the kick portion 104A of the FR side member 104 and a floor tunnel reinforcement (not shown; hereinafter also referred to as "floor tunnel RIF") which is provided at an inner side, in a width direction of the vehicle, relative to the kick portion 104A, an inner torque box 106 is provided as a skeleton member combining the kick portion 104A and the floor tunnel RIF. The FR suspension member 100 is also combined with the inner torque box 106. In other words, the FR suspension member 100 is combined with the FR side member 104 via the suspension member brace 102 and the inner torque box 106.

If the FR suspension member 100 is provided at a lower position than that in the related art in order to satisfy demands for a lower center of gravity for the vehicle, a height difference (deviation in an up-and-down direction) between the FR suspension member 100 and the kick portion 104A of the FR side member 104 becomes larger. As a result, the suspension member brace 102 which combines these members would have an S shape, as exemplified in FIG. 7, in which there is provided an inclined portion 102A which is inclined to rise from the suspension member brace 102 toward the kick portion 104A.

The suspension member brace 102 has, in addition to the function to combine the FR suspension member 100 and the FR side member 104, a function as a bracing member for suppressing rearward movement of the FR suspension member 100 during front collision (hereinafter also referred to as "FR collision"). However, when the suspension member brace 102 has the S shape as shown in FIG. 7, a bent portion thereof may become a starting point for a bending deformation, and rigidity of the structure would be reduced as compared to the case where the suspension member brace 102 is formed in a straight shape in the front-and-rear direction of the vehicle.

In consideration of this, in JP 2003-252250 A, as exemplified in FIG. 8, a rear part of the inner torque box 106 is extended to a lower region, to provide an opposing wall 106A which opposes the rear end of the FR suspension member 100. During the front collision, the FR suspension member 100 collides with the opposing wall 106A of the inner torque box 106, and thus, further rearward movement therefrom can be suppressed.

When there is provided a structure which receives the FR suspension member which moves rearward during the front collision, a portion of the floor panel provided over this structure may be pushed upward during the front collision. As exemplified in FIG. 8, an upper end of the inner torque box 106 is combined with the floor panel 108 via a flange 104A of the FR side member 104.

During the front collision, the FR suspension member 100 moves rearward, and the opposing wall 106A of the inner torque box 106 receives and stops the FR suspension member 100. When the collision further progresses, as exemplified in FIG. 9, the opposing wall 106A of the inner torque box 106 is pressed rearward by the FR suspension member 100. With this pressing, a rear upper end 106B of the inner torque box 106 is pushed upward. With the upward pushing, a combining portion 108A of the floor panel 108 with the rear upper end 106B of the inner torque box 106 is pushed upward (elevated), which consequently causes narrowing of the vehicle cabin space.

SUMMARY

According to one aspect of the present disclosure, there is provided a vehicle body lower structure. The vehicle body lower structure comprises a front side member, an inner torque box, a front suspension member, and a catcher bracket. The front side member is provided at a side in a width direction of a vehicle, and extends in a front-and-rear direction from an engine room at a front side of the vehicle to a region below a vehicle cabin at a rear side of the engine room. The inner torque box is provided under a floor panel which is a vehicle cabin floor plate, and is combined with an inner side wall, in the width direction of the vehicle, of a kick portion, under the vehicle cabin, of the front side member. The front suspension member extends from the engine room to a region below the inner torque box, and a rear end wall thereof is placed at a front side in relation to a rear end of the inner torque box. The catcher bracket protrudes from a bottom wall of the inner torque box in a downward direction. The catcher bracket comprises a front wall which is provided at a rear side than the rear end wall of the front suspension member and which opposes the rear end wall of the front suspension member, a rear wall provided at a rear side of the front wall, and a side wall provided between the front wall and the rear wall. On a bent portion of the catcher bracket which is a boundary between the side wall and the rear wall, a collapse bead which becomes a starting point of collapse deformation in the up-and-down direction is formed.

According to the above-described structure, the collapse bead which becomes the starting point of the collapse deformation in the up-and-down direction is formed at the bent portion which is a boundary between the side wall and the rear wall of the catcher bracket. During the front collision, when the front suspension member collides with the front wall of the catcher bracket and the catcher bracket is pressed rearward, a load to lift the rear portion of the catcher bracket is input, and a compressive load is applied to the rear wall of the catcher bracket, attempting to resist the load and maintain the shape. When the pressing further progresses, the rear wall collapses in the up-and-down direction (buckles) with the collapse bead as the starting point. As a result, the lifting of the rear wall of the catcher bracket is suppressed, and the lifting of the rear end of the inner torque box combined with the catcher bracket is also suppressed. Therefore, upward pressing to the combining portion of the floor panel with the rear end of the inner torque box is suppressed.

According to another aspect of the present disclosure, the vehicle body lower structure may further comprise a suspension member brace which combines the front suspension member and the front side member. In this case, the suspension member brace is combined with the front side member via the inner torque box and the catcher bracket.

By combining the suspension member brace to the catcher bracket which protrudes downward in relation to the inner torque box, it becomes possible to reduce a rising inclination of the suspension member brace from the front suspension member in comparison to the case where the suspension member brace is combined with the inner torque box, and the suspension member brace may assume a shape closer to a straight line shape. As a result, the rigidity in the front-and-rear direction of the suspension member brace (bracing rigidity) for suppressing a rearward movement of the front suspension member during the front collision can be improved as compared to the related art.

According to the present disclosure, when a structure which receives the front suspension member which moves rearward during the front collision is provided, upward pressing of the floor panel by this structure during the front collision can be suppressed.

BRIEF DESCRIPTION OF DRAWINGS

Embodiment(s) of the present disclosure will be described by reference to the following figures, wherein.

DESCRIPTION OF EMBODIMENTS

A vehicle body lower structure according to an embodiment of the present disclosure will now be described with reference to FIGS. 1~6. In FIGS. 1~6, a front-and-rear direction of the vehicle is shown by an axis represented by reference sign FR, a width direction of the vehicle (hereinafter, also simply referred to as "width direction") is shown by an axis represented by reference sign RW, and a vertical direction is shown by an axis represented by a reference sign UP. The reference sign FR is an abbreviation for "front," and the front-and-rear direction axis FR has a front direction of the vehicle as a positive direction. The reference sign RW is an abbreviation for "right width," and the width direction axis RW has a right width direction as a positive direction. The height axis UP has the upward direction as a positive direction.

Figure 1:
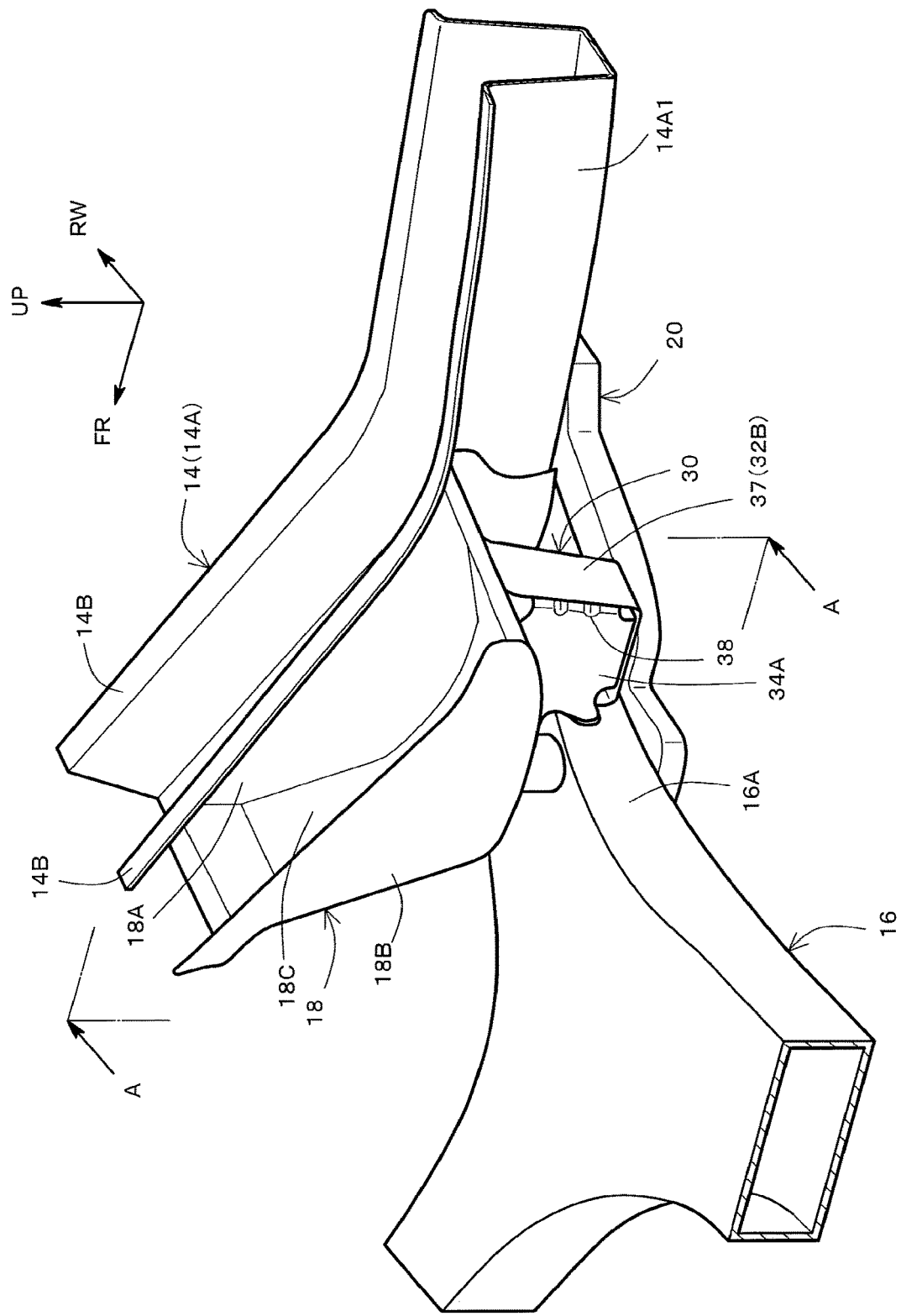
FIG. 1 is a perspective diagram exemplifying a vehicle body lower structure according to an embodiment of the present disclosure.

As shown in FIG. 1, the FR axis, the RW axis, and the UP axis are orthogonal to each other. In the following, in the description of the vehicle body lower structure according to the present embodiment, these three axis are referred to as a reference. For example, a "front end" refers to an end of an arbitrary member in a positive direction side of the FR axis, and a "rear end" refers to an end of an arbitrary member in a negative direction side of the FR axis. Similarly, a "width inner side" refers to a relatively inner side in the width direction of the vehicle along the RW axis, and a "width outer side" refers to a relatively outer side in the width direction of the vehicle along the RW axis. Further, an "upper side" refers to a relatively positive direction side of the UP axis, and a "lower side" refers to a relatively negative direction side of the UP axis.

Figure 2:
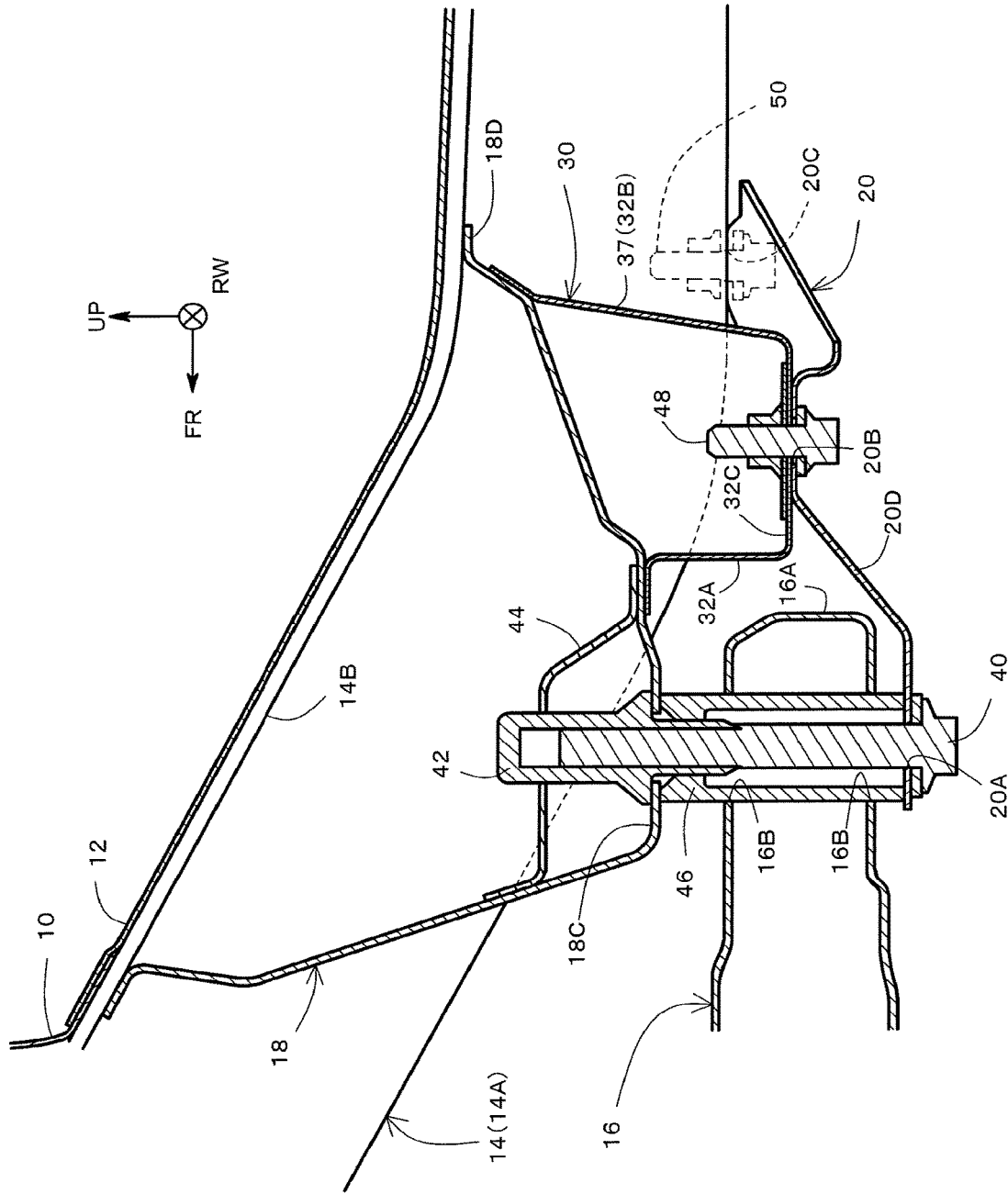
FIG. 2 is a cross-sectional diagram showing an A-A cross section of FIG. 1.

FIG. 1 exemplifies a perspective diagram of the vehicle body lower structure according to the present embodiment, and FIG. 2 exemplifies a side cross-sectional diagram of an A-A cross section of FIG. 1. The vehicle body lower structure according to the present embodiment is a lower structure of a vehicle body (body), and relates to a vehicle body lower structure at a front side of the vehicle. Specifically, the vehicle body lower structure of the present embodiment relates to the vehicle body lower structure from a region at a rear side of the engine room at the front side of the vehicle to a region at a front side of the vehicle cabin (cabin).

FIGS. 1 and 2 show a vehicle body lower structure below a dash panel 10 which separates the engine room and the vehicle cabin, and below a floor panel 12 which is a vehicle cabin floor plate. The vehicle body lower structure comprises a FR side member 14, a FR suspension member 16, an inner torque box 18, a suspension member brace 20, and a catcher bracket 30. In FIG. 1, only the vehicle body lower structure at a right side of the vehicle is shown, but because of the symmetry of the vehicle body structure, the left side of the vehicle has a similar structure.

The FR side member 14 is a skeleton member which is provided at a side in the width direction of the vehicle, and which extends in the front-and-rear direction from the engine room at the front side of the vehicle to a region below the vehicle cabin at a rear side of the engine room. Of portions of the FR side member 14, at a portion below the vehicle cabin; that is, a portion at the front side of and below the floor panel 12, a kick portion 14A which is inclined in a slanted manner in rearward and downward direction is provided.

The kick portion 14A of the FR side member 14 has a shape where a hat shape in the front view is placed in an upside-down manner, and the floor panel 12 is combined with a flange 14B which corresponds to the brim of the hat. For example, these members are joined by spot welding or the like. A closed cross-section structure is formed by the kick portion 14A and the floor panel 12.

At a center part in the width direction of the floor panel 12, a floor tunnel (not shown) for passing an exhaust pipe or the like therethrough is provided in a protruding manner. Further, at a boundary portion of the floor panel 12 with the floor tunnel, a floor tunnel R/F (not shown) which is a reinforcement member is provided below the panel. The inner torque box 18 is provided as a skeleton member for combining the kick portion 14A of the FR side member 14 provided at the side of the vehicle and the floor tunnel RIF provided at the center of the vehicle.

The inner torque box 18 has an outer wall 18A and an inner wall 18B which have an approximate triangular shape in side view and a shape inclined along the kick portion 14A in a slanted manner in the rearward and downward direction. The inner torque box 18 further comprises a bottom wall 18C which connects the outer wall 18A and the inner wall 18B in the width direction. An upper part of the inner torque box 18 is opened, and the floor panel 12 is placed over the opening.

The outer wall 18A of the inner torque box 18 is combined with an inner wall 14A1 of the kick portion 14A. For example, these members are joined by spot welding or the like. In addition, the inner wall 18B of the inner torque box 18 is combined with an outer wall of the floor tunnel R/F (not shown). As exemplified in FIG. 2, in an inner space of the inner torque box 18, a weld nut 42 is provided, into which a bolt 40 to be fastened to the FR suspension member 16 is screwed. In addition, a reinforcement member 44 is provided which supports the weld nut 42.

The FR suspension member 16 is a skeleton member which supports a suspension mechanism (not shown) of a front wheel of the vehicle. The FR suspension member 16 extends from the engine room to a region below the vehicle cabin. A front end of the FR suspension member 16 is connected to a bumper reinforcement (not shown) which is a skeleton member at a frontmost end of the vehicle. On the other hand, a rear end wall 16A of the FR suspension member 16 is placed below the inner torque box 18, and at a front side in relation to a rear end of the inner torque box 18.

A fastening hole 16B is formed at a rear side the FR suspension member 16, and the bolt 40 and a collar 46 are inserted into the fastening hole 16B. The bolt 40 is screwed into the weld nut 42 provided in the inner torque box 18. With this configuration, the FR suspension member 16 is combined with the kick portion 14A of the FR side member 14 via the inner torque box 18.

The FR suspension member 16 is also supported by the suspension member brace 20. The suspension member brace 20 is a reinforcement member (beam member) which extends in the front-and-rear direction of the vehicle, and is fastened to the FR suspension member 16, the catcher bracket 30, and the FR side member 14. On the suspension member brace 20, three fastening holes 20A, 20B, and 20C are formed in order from the front side. The bolt 40 is inserted into the fastening hole 20A, and, with this operation, the suspension member brace 20 is fastened to the FR suspension member 16 and the inner torque box 18. A bolt 48 is inserted into the fastening hole 20B, and, with this operation, the suspension member brace 20 is fastened to the catcher bracket 30. A bolt 50 is inserted into the fastening hole 20C, and, with this operation, the suspension member brace 20 is fastened to the kick portion 14A of the FR side member 14.

In other words, in relation to the fastening hole 20A, the suspension member brace 20 is combined with the FR side member 14 via the inner torque box 18. In relation to the fastening hole 20B, the suspension member brace 20 is combined with the FR side member 14 via the catcher bracket 30 and the inner torque box 18. In relation to the fastening hole 20C, the suspension member brace 20 is directly combined with the FR side member 14.

The suspension member brace 20 has an inclined portion 20D which is inclined in a slanted manner in a rearward and upward direction at a region from the fastening hole 20A to the fastening hole 20B at a rear side of the fastening hole 20A. The suspension member brace 20 in the present embodiment is combined, at the fastening hole 20B, to the catcher bracket 30, which is provided to protrude downward in relation to the inner torque box 18. Because of this, the inclination of the inclined portion 20D is closer to horizontal (flat) as compared to a case where the suspension member brace 20 is combined with the inner torque box 18.

As will be described later, during the front collision, the suspension member brace 20 braces to suppress rearward movement of the FR suspension member 16. In this bracing, by setting the shape thereof to a shape near the straight line shape in the side view along the horizontal line; that is, a shape having a smaller difference in height, it becomes possible to increase the rigidity in the front-and-rear direction with respect to the FR suspension member 16 (bracing rigidity).

The catcher bracket 30 is a reinforcement member which is provided in a protruding manner from a rear side of the bottom wall 18C of the inner torque box 18 in the downward direction. As exemplified in FIG. 3, the catcher bracket 30 is an approximate box-shape member having an upper portion opened, and comprises a front wall 32A, a rear wall provided at a rear side of the front wall 32A, an inner wall 34A and an outer wall 34B provided between the front wall 32A and the rear wall 32B, and a bottom wall 32C. The catcher bracket is formed, for example, as a divided structure having a front-rear portion 32 and a left-right portion 34, as exemplified in FIG. 4.

The front-rear portion 32 includes the front wall 32A, the rear wall 32B, and the bottom wall 32C. The front wall 32A is placed in a vertically standing manner along a RW-UP plane. The rear wall 32B is provided at the rear side of the front wall 32A, and is provided in a vertically stranding manner along the RW-UP plane, similar to the front wall 32A. The bottom wall 32C connects lower ends of the front wall 32A and the rear wall 32B, and extends horizontally along a RW-FR plane.

In addition, at each of upper ends of the front wall 32A and the rear wall 32B, a flange 31 is provided for combining with (for example, welding with) the inner torque box 18. In addition, a fastening hole 33 into which the bolt 48 is inserted is formed on the bottom wall 32C.

The left-right portion 34 includes the inner wall 34A, the outer wall 34B, and a bottom wall 34C. The inner wall 34A is provided in a vertically standing manner along a FR-UP plane. The outer wall 34B is provided at an outer side in the width direction than the inner wall 34A, and is provided in a vertically standing manner along the FR-UP plane. The bottom wall 34C connects lower ends of the inner wall 34A and the outer wall 34B, and extends horizontally along the RW-FR plane. At each of upper ends of the inner wall 34A and the outer wall 34B, the flange 31 is formed for combining with (for example, welding with) the inner torque box 18. In addition, a fastening hole 35 which is aligned with the fastening hole 33 of the front-rear portion 32 is formed on the bottom wall 34C.

Further, at a rear end of the inner wall 34A, a fold portion 34D which is folded in a right angle toward the side of the outer wall 34B is provided. Similarly, at a rear end of the outer wall 34B, a fold portion 34F which is folded in the right angle toward the side of the inner wall 34A is provided.

Figure 3:
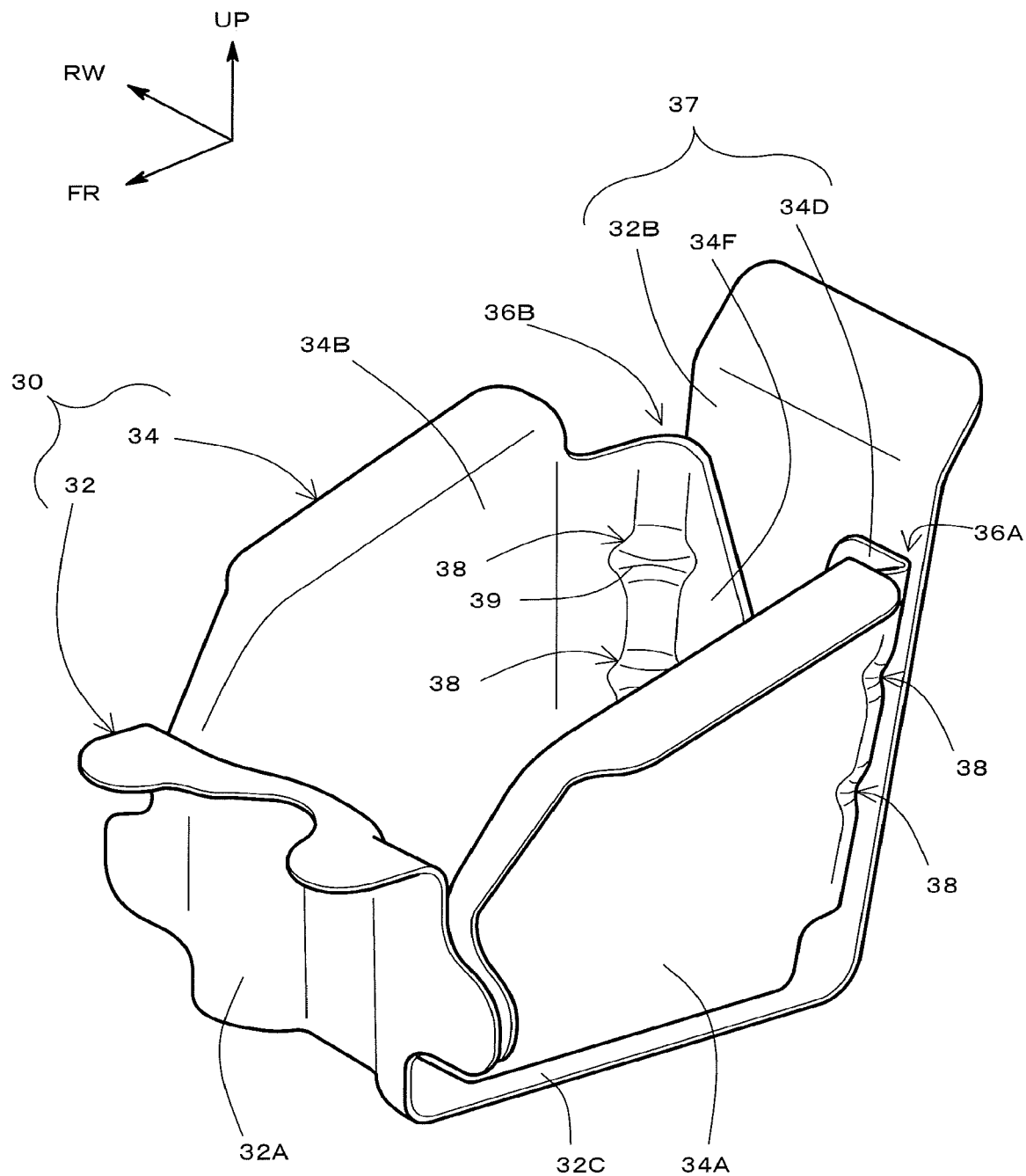
FIG. 3 is a perspective diagram exemplifying a catcher bracket according to an embodiment of the present disclosure.
Figure 4:
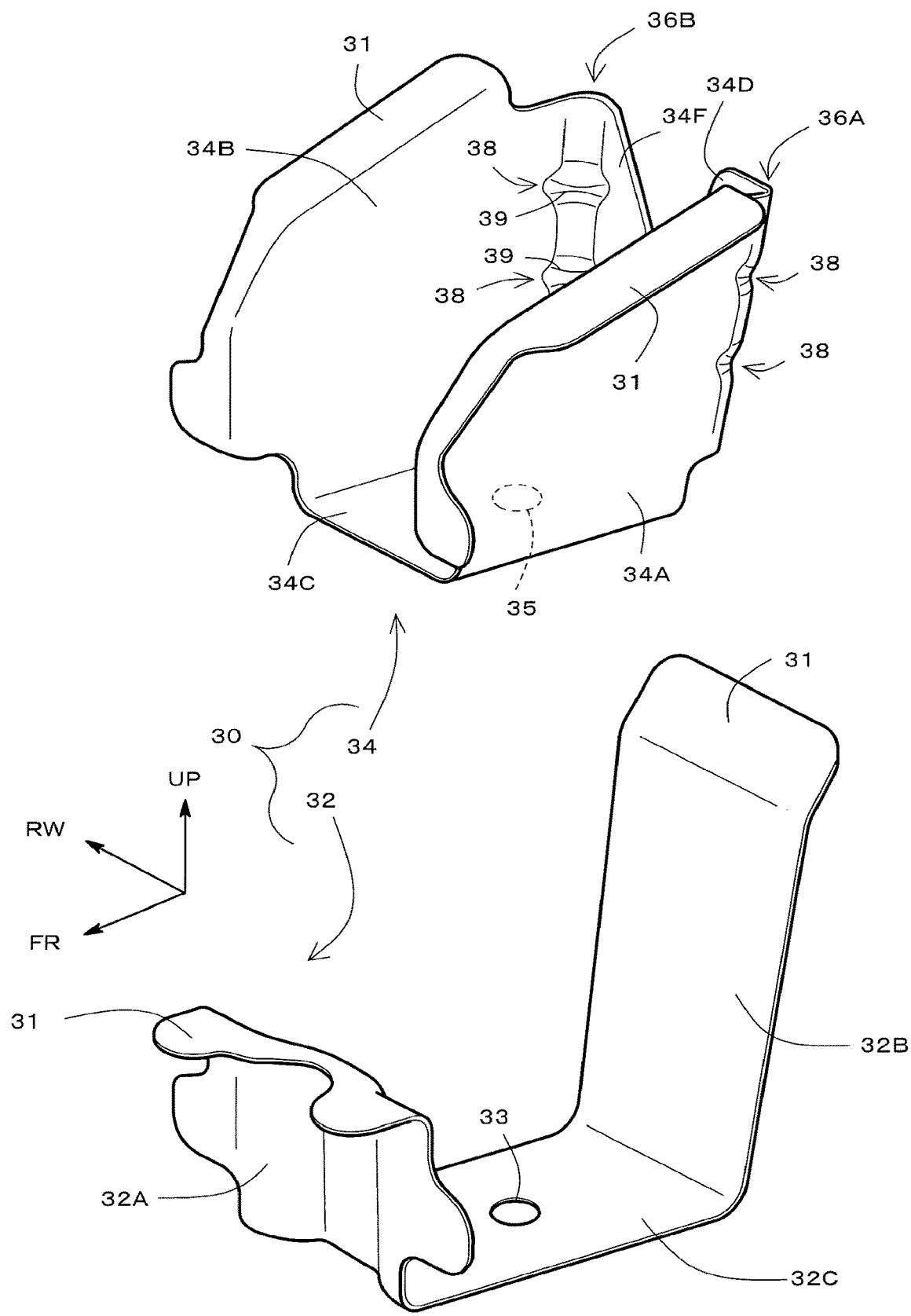
FIG. 4 is an exploded perspective diagram exemplifying a member forming a catcher bracket according to an embodiment of the present disclosure.

As exemplified in FIG. 3, when the front-rear portion 32 and the left-right portion 34 are overlapped to assemble the catcher bracket 30, the fold portions 34D and 34F of the left-right portion 34 are overlapped with the rear wall 32B of the front-rear portion 32 and are combined to the rear wall 32B by welding or the like. In other words, a rear wall 37 of the catcher bracket 30 is formed by the rear wall 32B of the front-rear portion 32 and the fold portions 34D and 34F of the left-right portion 34.

In addition, of the left-right portion 34, at a bent portion 36A which corresponds to a boundary (folding line) between the inner wall 34A and the fold portion 34D and at a bent portion 36B which corresponds to a boundary between the outer wall 34B and the fold portion 34F, collapse beads 38 are formed.

According to the assembly diagram of FIG. 3, the boundary between the inner wall 34A and the rear wall 37 corresponds to the bent portion 36A, and the collapse bead 38 is formed therein. Similarly, the boundary between the outer wall 34B and the rear wall 37 corresponds to the bent portion 36B, and the collapse bead 38 is formed therein. The collapse bead 38 is a recess provided on each of the bent portions 36A and 36B, and is provided to protrude toward the inner side of the catcher bracket 30. With the collapse bead 38, a ridgeline 39 which is cut in an orthogonal direction (horizontal direction) with respect to a direction of extension of the bent portions 36A and 36B (up-and-down direction) is formed on the bent portions 36A and 36B. The ridgeline 39 becomes a starting point of collapse deformation (deformation start point) in the up-and-down direction of the catcher bracket 30. For example, for each of the bent portions 36A and 36B, two collapse beads 38 at upper and lower positions are formed.

As will be described below, in the vehicle body lower structure according to the present embodiment, the collapse bead 38 is provided in order to cause collapse deformation of the rear wall 37 of the catcher bracket 30 before the floor panel 12 is pressed upward. Thus, for example, the collapse bead 38 may be provided such that a load tolerance of the rear wall 37 of the catcher bracket 30 (yield load) with respect to a compressive load is lower than an upper limit of a load (yield load) pressing the rear end 18D of the inner torque box 18 (refer to FIG. 2).

As already described, the rear end 18D of the inner torque box 18 has a structure to be pressed by the flange 14B of the FR side member 14 and a flange (not shown) of the floor tunnel R/F. Therefore, for example, the collapse bead 38 may be provided such that the load tolerance of the rear wall 37 of the catcher bracket 30 with respect to the compressive load is lower than an upper limit of a bending load (yield load) at the two flanges described above.

With reference to FIG. 2, in the catcher bracket 30, the front wall 32A is placed at a rear side in relation to the rear end wall 16A of the FR suspension member 16 and in a manner to oppose the rear end wall 16A. By employing such a configuration, when the FR suspension member 16 moves rearward during the front collision, the rear end wall 16A thereof collides with the front wall 32A of the catcher bracket 30, and a further rearward movement can be suppressed.

It is not necessary that the front wall 32A of the catcher bracket 30 can collide with the rear end wall 16A of the FR suspension member 16 over the entire up-and-down width. For example, the opposing positions of these members may be determined such that an upper half of the rear end wall 16A of the FR suspension member 16 collides with a lower half of the front wall 32A of the catcher bracket 30.

<Behavior during Front Collision>

Figure 5:
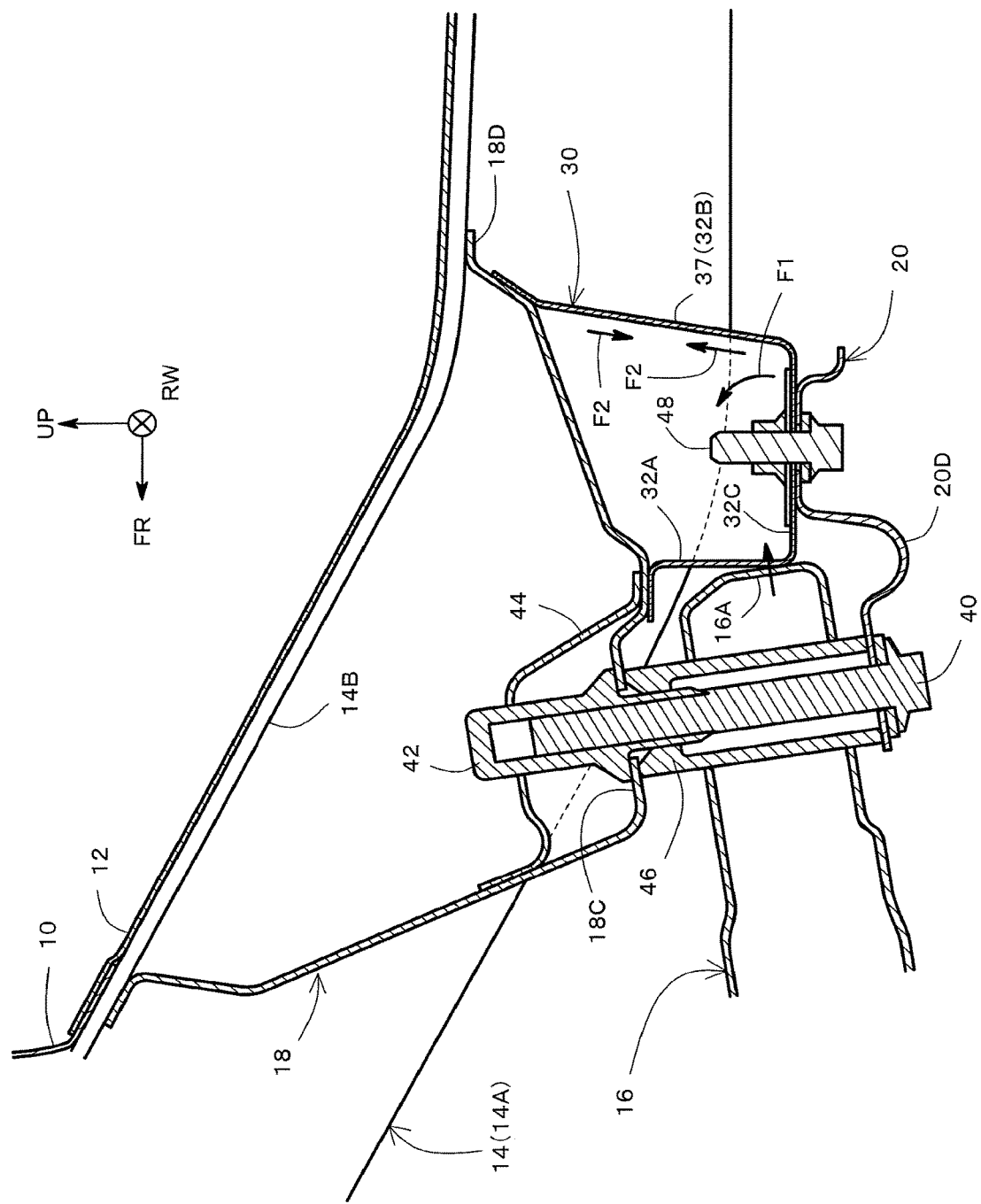
FIG. 5 is a diagram exemplifying an initial stage of front collision.
Figure 6:
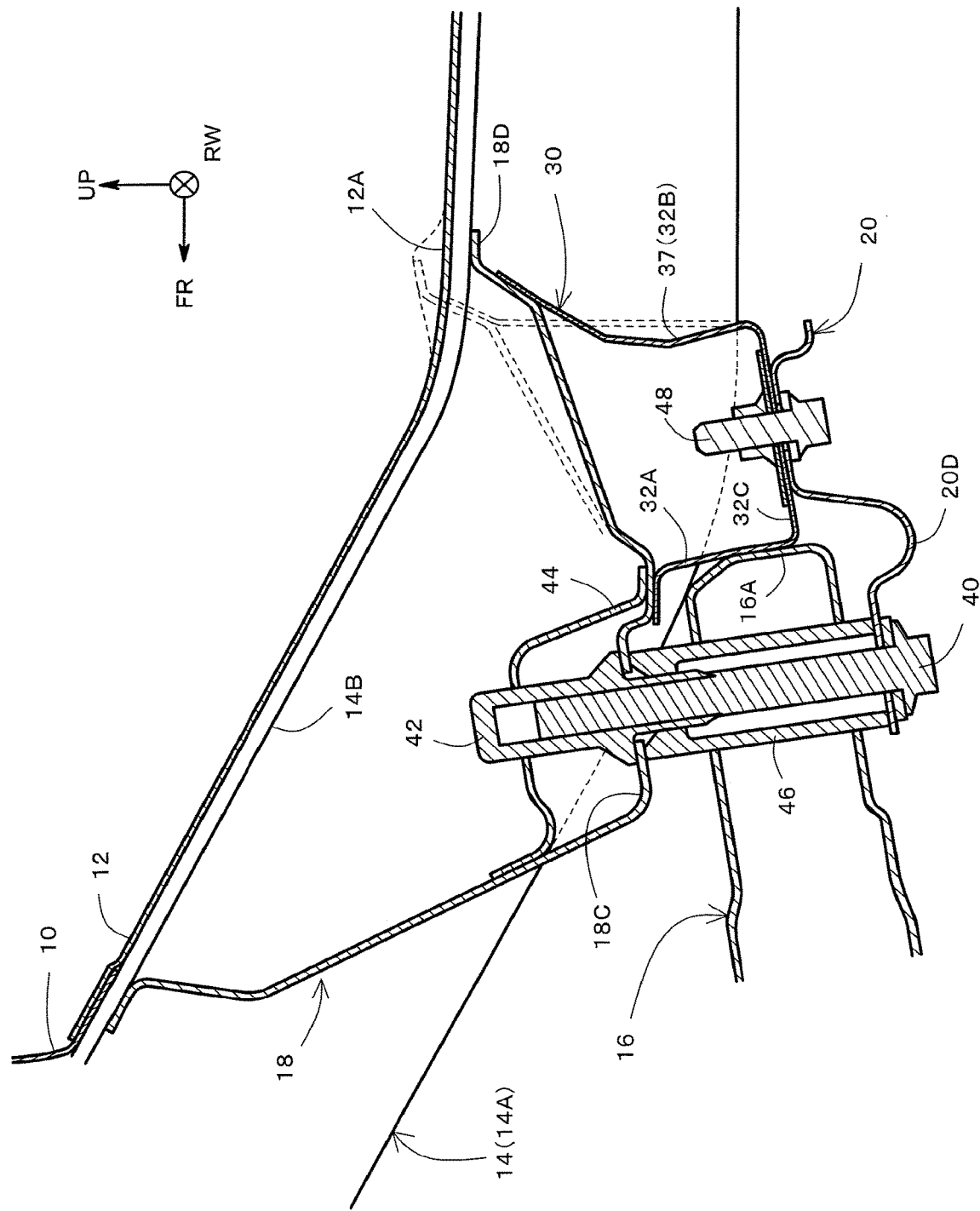
FIG. 6 is a diagram exemplifying a progressed stage of the front collision.
Figure 7:
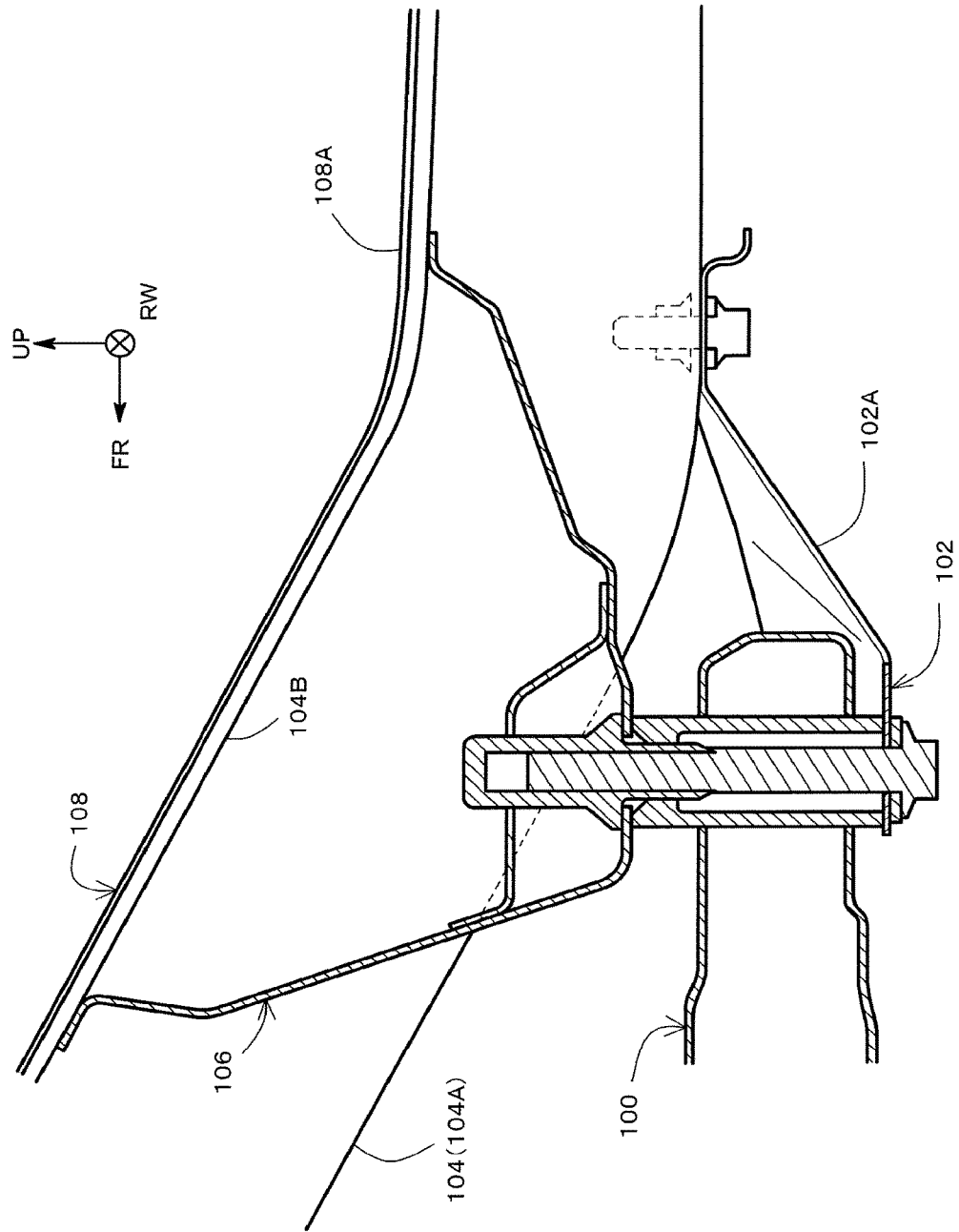
FIG. 7 is a side cross-sectional diagram exemplifying a vehicle body lower structure according to the related art.
Figure 8:
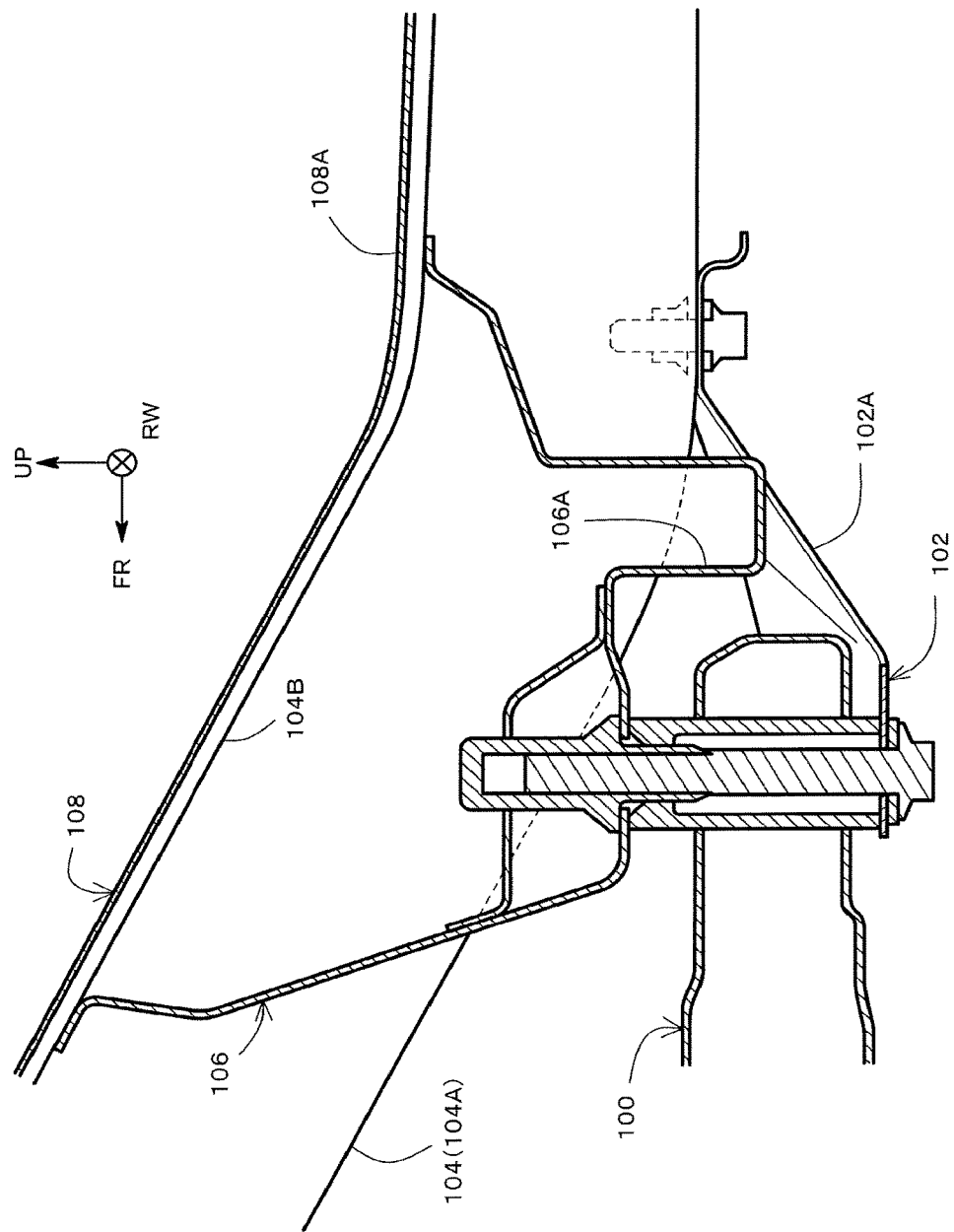
FIG. 8 is a side cross-sectional diagram exemplifying another vehicle body lower structure according to the related art.
Figure 9:
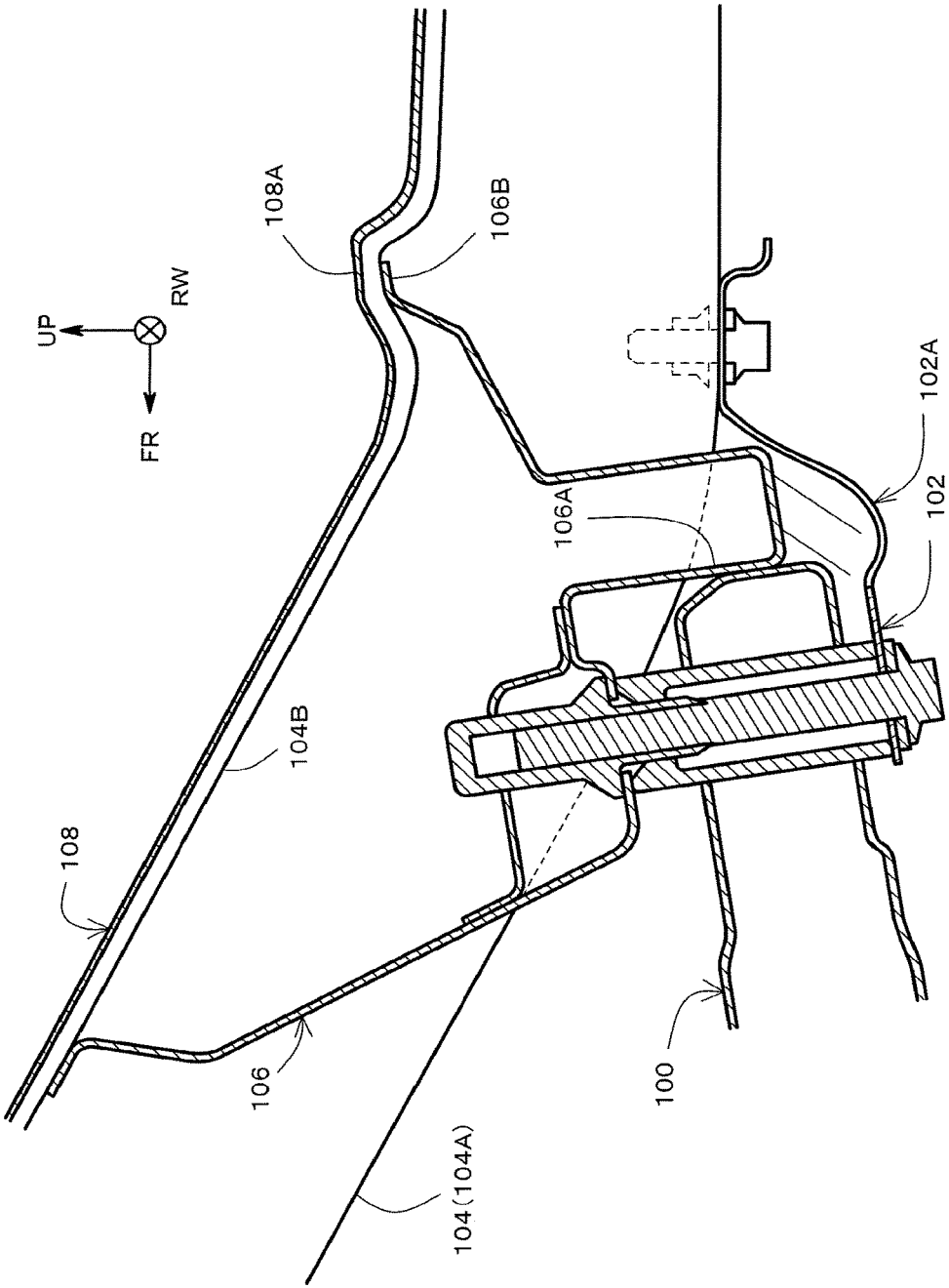
FIG. 9 is a side cross-sectional diagram exemplifying front collision in a vehicle body lower structure of the related art.

With reference to FIGS. 5 and 6, a behavior of the vehicle body lower structure according to the present embodiment during the front collision will now be described. When an obstruction (barrier) collides with the front side of the vehicle, a collision load is transferred from a bumper R/F at the frontmost end of the vehicle to the FR suspension member 16. In this process, the suspension member brace 20 braces against the load to move the FR suspension member 16 rearward.

Then, with the entrance of the barrier, the rearward load with respect to the FR suspension member 16 exceeds the load tolerance of the suspension member brace 20, and, as exemplified in FIG. 5, the suspension member brace 20 buckles and deforms. With this process, the FR suspension member 16 moves rearward. The FR suspension member 16 in this process is supported by the inner torque box 18, and the FR suspension member 16 moves rearward in a manner to pull the inner torque box 18. By the inner torque box 18 provided above the FR suspension member 16 being deformed while resisting this pulling, the upper portion of the FR suspension member 16 is pulled. As a result, the FR suspension member 16 moves rearward, from a horizontal state to a state of being directed in a slanted manner toward the rearward and upward direction.

The rearward-moved FR suspension member 16 then collides with the front wall 32A of the catcher bracket 30 placed at the rear side of the FR suspension member 16. With this collision, the rearward movement of the FR suspension member 16 is suppressed.

When the entrance of the barrier into the vehicle further progresses, the FR suspension member 16 presses the catcher bracket 30 rearward. As described above, because the FR suspension member 16 collides with the catcher bracket 30 in the slanted manner in the rearward and upward direction, a load F1 to lift the rear portion is input to the catcher bracket 30.

In this process, on the rear wall 37 of the catcher bracket 30 attempting to maintain the shape against the load F1, a compressive load F2 is input. When the compressive load F2 exceeds a predetermined load tolerance, as exemplified in FIG. 6, the rear wall 37 collapses and deforms in the up-and-down direction, with the collapse bead 38 as the starting point.

With the collapse deformation of the rear wall 37, lifting of the rear wall 37 is suppressed. Further, the lifting of the rear end 18D of the inner torque box 18 combined with the rear wall 37 is also suppressed. As a result, the upward pressing of the portion 12A of the floor panel 12 above the rear end 18D, as shown by a broken line in FIG. 6, can be suppressed.

The present disclosure is not limited to the embodiment described above, and includes all modifications and alternative configuration within the scope and spirit of the present disclosure defined in the claims.

The invention claimed is:

1. A vehicle body lower structure comprising:
   a front side member that is provided at a side in a width direction of the vehicle, and that extends in a front-and-rear direction from an engine room at a front side of the vehicle to a region below a vehicle cabin at a rear side of the engine room;
   an inner torque box that is provided below a floor panel which is a vehicle cabin floor plate and that is combined with an inner wall, in the width direction of the vehicle, of a kick portion, below the vehicle cabin, of the front side member;

a front suspension member that extends from the engine room to a region below the inner torque box, and that has a rear end wall placed at a front side in relation to a rear end of the inner torque box; and a catcher bracket that is provided to protrude from a bottom wall of the inner torque box in a downward direction, and that includes a front wall which is provided at a rear side in relation to the rear end wall of the front suspension member and which opposes the rear end wall, a rear wall provided at a rear side of the front wall, and a side wall provided between the front wall and the rear wall, wherein a collapse bead which becomes a starting point of a collapse deformation in an up-and-down direction is formed at a bent portion of the catcher bracket which corresponds to a boundary between the side wall and the rear wall.

2. The vehicle body lower structure according to claim 1, further comprising:

a suspension member brace that combines the front suspension member and the front side member, wherein the suspension member brace is combined with the front side member via the inner torque box and the catcher bracket.

* * * * *